G. W. WIGNER.
Utilizing Sewage.
No. 108,664.
2 Sheets—Sheet 1.
Patented Oct. 25, 1870
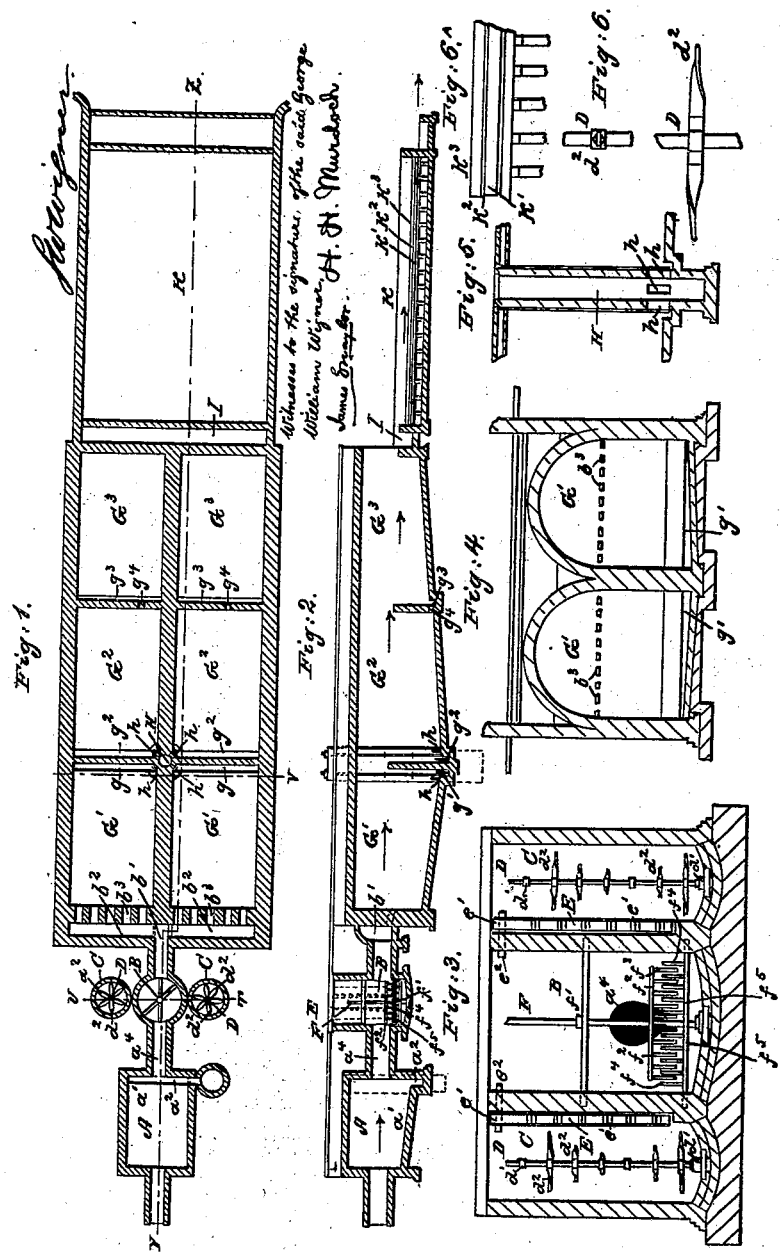

G. W. WIGNER.
Utilizing Sewage.
No. 108,664.
2 Sheets—Sheet 2.
Patented Oct. 25, 1870.
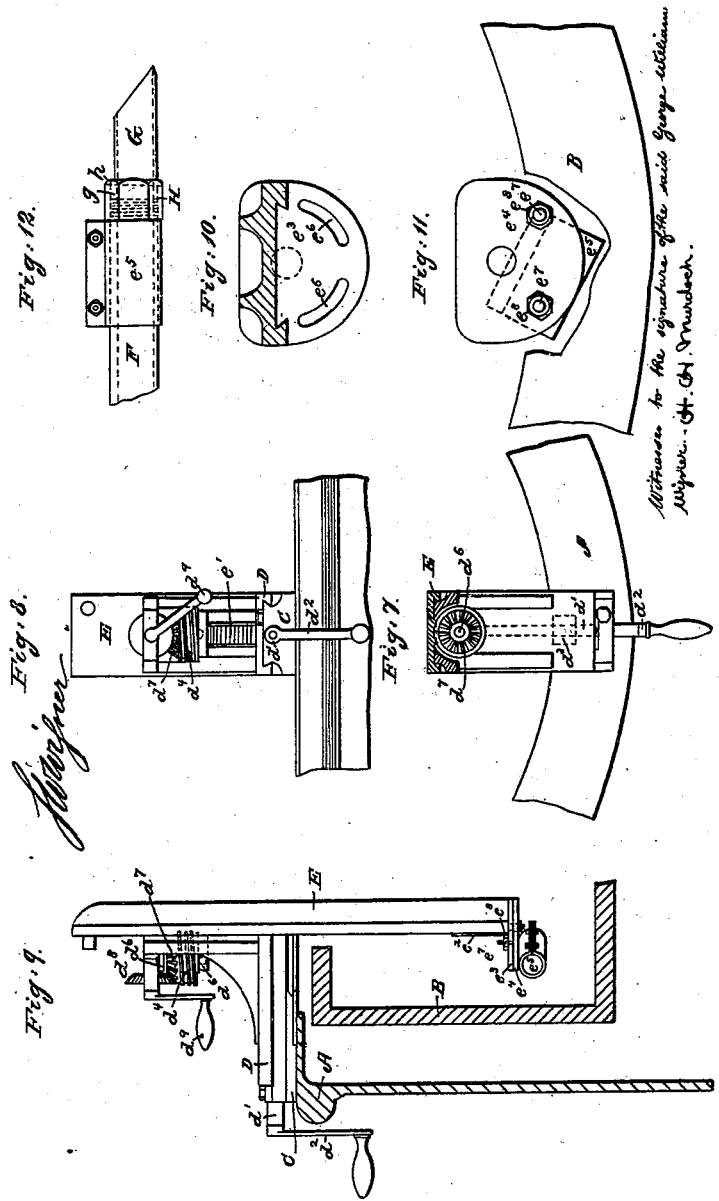

UNITED STATES PATENT OFFICE.

GEORGE WILLIAM WIGNER, OF LONDON, ENGLAND.

IMPROVEMENT IN UTILIZING SEWAGE.

Specification forming part of Letters Patent No. 108,664, dated October 25, 1870.

*To all whom it may concern:*

Be it known that I, GEORGE WILLIAM WIGNER, of No. 1 St. Swithin's Lane, in the city of London, England, analytical chemist, a subject of the Queen of Great Britain, have invented or discovered new and useful improvements in the mode of and apparatus for treating and purifying sewage or water impregnated with sewage and making manure therefrom, part of which apparatus is applicable to other purposes; and I, the said GEORGE WILLIAM WIGNER, do hereby declare the nature of the said invention and in what manner the same is to be performed, to be particularly described and ascertained in and by the following statement thereof, that is to say—

My invention relates to a process for which I, in conjunction with William Cameron Sillar and Robert George Sillar, obtained a patent in the United States of America, such patent bearing date the 15th day of June, 1869. According to that process, alum, blood, clay, magnesia or one of its compounds, by preference the carbonate or the sulphate, burnt clay, (otherwise known as "ballast,") chloride of sodium, animal charcoal, vegetable charcoal, and magnesian limestone were mixed with sewage, which was then allowed to flow into tanks, in which the greater part of its impurities fell to the bottom, leaving the supernatant water clear and inodorous, or nearly so.

Now, my present invention consists, first, in the addition to the substances above enumerated of sulphate of alumina, sulphate of iron, sulphate of lime, and alumina. The said sulphate of alumina, sulphate of iron, sulphate of lime, and alumina, in a commercially pure or manufactured state, may be added to the substances herein first mentioned; or crude alum, containing sulphate of alumina, sulphate of iron, sulphate of lime, and free alumina, or any of them in the form of impurities, may be added to the said substances. The relative proportions of the sulphate of alumina, sulphate of iron, sulphate of lime, and alumina, and the alum, blood, clay, and other substances herein first mentioned, are or may be varied according to the nature of the sewage to be purified, and if any of the said substances should be present in sufficient quantity in the said sewage, such substance or substances may of course be omitted. For ordinary sewage I find the following proportions to answer well: alum, three hundred and thirty-eight parts by weight; blood, two parts by weight; clay, one thousand and ten parts by weight; magnesia, five parts by weight; burnt clay, ten parts by weight; chloride of sodium, five parts by weight; animal charcoal, fifteen parts by weight; vegetable charcoal, twenty parts by weight; magnesian limestone, one part by weight; sulphate of alumina, ninety parts by weight; sulphate of iron, two parts by weight; sulphate of lime, thirty-five parts by weight; alumina, fifty parts by weight. With respect to the blood I would observe that it is most important to use perfectly fresh blood—*i. e.*, blood which is drawn direct from a healthy animal as it is being slaughtered, and which is prevented from coagulating by being immediately mixed with clay, as blood so used retains for a considerable time the properties which fit it for use as a purifying agent. It may therefore be termed "live blood."

When crude alum containing any of the above-named substances as impurities is used, the said alum should be used in sufficient quantity to furnish the proper proportions of the ingredients which it contains.

The sulphate of alumina, sulphate of iron, sulphate of lime, and alumina, in either of the forms hereinbefore described, are either dissolved in water and added to the other substances above mentioned, or the said sulphate of alumina, sulphate of iron, sulphate of lime, and alumina are dissolved in admixture with the said substances, and the mixture made in either of the above ways is then added to the sewage to be purified, and mixed therewith in the proportion of four pounds of the mixture to one thousand gallons of sewage. The sewage mixed with the chemical substances aforesaid is then allowed to flow into settling or precipitating tanks, as described in the specification of the patent hereinbefore referred to. The sediment or mud precipitated from the mixture of the sewage and the said chemical substances may be dried in any convenient manner—as, for instance, by adding a sufficient quantity of sulphate of lime; but I prefer to dry the said sediment or mud by means of centrifugal hydro-extractors furnished with the apparatus hereinafter described.

My invention further consists of the improved apparatus hereinafter described, and illustrated in Figures 1 to 6$^A$ (both inclusive) of the accompanying drawings, for effecting the purification of the sewage by mixing chemical substances therewith and precipitating the impurities, as hereinbefore described.

Fig. 1 of the said drawings is a horizontal section of the said apparatus. Fig. 2 is a vertical longitudinal section of the same, taken on the line Y Z, Fig. 1. Fig. 3 is a transverse section of the said apparatus on a larger scale, the said section being taken on the line T U. Fig. 4 is a transvease section taken on the line V X, Fig. 1. Fig. 5 is a vertical section of the mud-well hereinafter referred to. Fig. 6 represents on a larger scale side and end elevations of one of the stirrers $d^2$, hereinafter referred to.

The same letters and figures of reference indicate the same parts in each of the several figures.

A is a pit, which I term a "catch-pit," into which the sewage is caused to pass on its way from the main sewer to the mixing-pit B. The pit A is formed with a sloping bottom, $a'$, and a mud-channel, $a^2$, leading into a well, $a^3$. The sewage as it passes through the said pit deposits part of its sand and other suspended matters which are conveyed by the mud-channel $a^2$ to the well $a^3$, whence they are pumped out or otherwise removed. C C are mixing-pits in which the chemical substances to be used for the purification of the sewage are or may be mixed previously to being added thereto. The said pits are furnished with agitators or stirrers consisting of shafts D D, which revolve in bearings $d'd'$, and carry radial arms $d^2 d^2$, formed of flat blades of iron twisted, as represented in Fig. 6, so as somewhat to resemble the blades of a screw-propeller. E E are endless chains carrying buckets $e' e'$, by which the chemical substances are raised from the pits C C and delivered through troughs or channels $e^2 e^2$ to the mixing-pit B, into which the sewage passes from the culvert $a^4$. The said substances are mixed with the sewage by means of a shaft, F, which revolves in bearings $f' f'$, and to which are affixed radial arms $f^2 f^2$, furnished with tangs or teeth $f^3 f^3$, which work between stationary tangs or teeth $f^4 f^4$, fixed either to a bar, $f^5$, extending across the pit, as shown, or in the bottom of the pit itself. As the shaft F revolves, the tangs or teeth $f^3 f^3$ pass between the tangs or teeth $f^4 f^4$ and tear up and thoroughly macerate any coarse solid matter contained in the sewage, and mix with the said sewage the chemical or other substances used for its purification. The shafts D D and F may be driven by steam or other suitable motive power. G' G' G$^2$ G$^2$ G$^3$ G$^3$ are precipitating-tanks, into which the mixture of sewage and chemical substances passes from the mixing-pit B, the said mixture being introduced through a culvert, $b' b^2$, and openings $b^3 b^3$ in the brick-work. The bottoms of the tanks slope toward the line V X, and have mud-channels $g' g' g^2 g^2 g^3 g^3$. H is a well constructed at the junction of the tanks G' G' G$^2$ G$^2$. (See Figs. 1, 2, and 5.)

The sediment or mud deposited by the sewage in the tanks G$^3$ G$^3$ passes into the channels $g^3 g^3$, and thence through openings $g^4 g^4$ in the partition-wall to the tanks G$^2$ G$^2$. The said openings may be furnished with penstocks. The sediment or mud in the tanks G' G' G$^2$ G$^2$ passes into the channels $g' g' g^2 g^2$, and thence through penstocks $h h h h$ into the well H, whence the said sediment or mud is removed by means of a pump or other suitable apparatus. (Not shown.) As the sewage flows from one set of tanks to another, it passes over the transverse partition-walls, and the effluent water is received in the collecting-culvert I, through or over which the said water is delivered to the filter K, whence the said water passes in a pure or nearly pure state to a river or other suitable outlet; or the said water may be discharged into the river or other outlet without filtration.

My invention further consists of the improvement hereinafter described in the construction of the said filter. As filters of this description are ordinarily constructed, the top layer of filtering medium consists of charcoal or other chemical substance, which is apt to get disturbed or removed when the filter is being cleaned. Now, in order to obviate this difficulty I stretch over the said top layer of charcoal, $k'$, or other chemical substance a sheet of canvas, $k^2$, or other similar permeable material, which protects the said charcoal or other chemical substance from removal or disturbance, and over the said sheet of canvas or other material I put a layer of sand, $k^3$, which intercepts the coarser portions of the impurities in the effluent water aforesaid, so that when it is wished to clean the filter the said layer of sand and the impurities intercepted thereby can be removed without disturbing the charcoal or other chemical substance.

My invention further consists of the improvements hereinafter described, and illustrated in Figs. 7, 8, 9, 10, 11, and 12 of the accompanying drawings, in centrifugal drying-machines (otherwise known as "hydro-extractors") used for drying sewage deposit, earth, mud, sugar, and other moist or plastic substances. The said machine consists of perforated metallic cylindrical baskets or sieves for containing the substance to be dried, which baskets or sieves revolve within cylindrical casings, into the annular space between which baskets and casings the water extracted from the substance under treatment is thrown by centrifugal force. Such substance as it is dried accumulates around the internal circumference of the basket or sieve, and is usually removed therefrom by shoveling or digging. Now, this part of my invention consists of the machinery or apparatus hereinafter described, to be applied to centrifugal drying-machines for the purpose of removing and discharging therefrom, while the same are in motion, the sewage deposit, mud, sugar, or other substance accumulated around the side of the basket or sieve, as aforesaid.

Fig. 7 is a plan of part of a hydro-extractor and of the apparatus above referred to, part of the said apparatus being in section. Fig. 8 is an elevation of the same. Fig. 9 is a vertical section of part of a hydro-extractor furnished with the aforesaid apparatus. Fig. 10 is a plan of the plate $e^3$, hereinafter referred to. Fig. 11 is a plan of part of the basket B and of the plate $e^4$ and tool-holder $e^5$, hereinafter referred to, part of the said basket being broken away in order the better to exhibit the said plate; and Fig. 12 is an elevation showing the way in which the discharge-pipe and cutting-tool, hereinafter described, are held together.

The same letters and figures of reference indicate the same parts in Figs. 7, 8, 9, 10, 11, and 12.

A is the cylindrical casing in which revolves the basket or sieve B, in which the mud or other substance is dried. The said casing and basket are of the ordinary kind. C is a dovetail bed fixed to the casing A, and D is a sliding bracket, (somewhat resembling the slider of the slide-rest of a lathe,) which bracket is traversed as required in the direction of a radius of the machine by means of a screw, $d'$, turned by a winch, $d^2$, which said screw works in a screw-box, $d^3$, carried by the said bracket; or the said bracket may be traversed by means of any other suitable mechanical arrangement. The inner end of the bracket D projects over the inner edge of the basket B and carries a dovetail slider, E, to which vertical motion in either direction is imparted, as required, by means of a worm, $d^4$, affixed to or cast with an axis, $d^5$, which turns in bearings $d^6$ $d^6$. The thread of the said worm engages in a rack, $e'$, formed on the slider E. The axis $d^5$ carries a bevel-toothed wheel, $d^7$, which is turned by means of another bevel-toothed wheel, $d^8$, mounted on a shaft furnished with a winch, $d^9$. Any other suitable mechanical arrangement may, however, be employed to raise and lower the slider E. On the lower end the said slider is affixed or formed an axis, $e^2$, which carries a plate, $e^3$. (See Fig. 10.) $e^4$ (see Fig. 11) is another plate which is capable of partial rotary motion on the axis $e^2$. To this plate is affixed a socket, $e^5$, (furnished with clamping-screws,) or a bracket, which socket (or bracket) carries the delivery-pipe F, (or a channel,) to which is affixed the cutting-tool G, used for removing the substance accumulated around the side of the basket B, the said discharge pipe and tube being held together by a union-nut, H, furnished with a shoulder, $h$, which abuts against a shoulder, $g$, on the end of the cutting-tool, as represented in Fig. 12.

$e^6 e^6$ (see Fig. 10) are concentric curved slots, through which pass screws $e^7 e^7$, (see Fig. 11,) furnished with nuts $e^8 e^8$, by means of which arrangement the plate $e^4$ and the socket and cutting-tool carried thereby can be fixed at any angle to which they may have been moved. The cutting-tool used may be either tubular or of any other form suitable for cutting. When a tubular tool is used, it may be of any convenient form in cross-section, and communicates with a discharge-pipe which rises and falls with the slider E. In some cases an india-rubber or other flexible tube may be attached to a cutting length of metal tube, so as to discharge the substance at any convenient point. When a cutting-tool which is not tubular is used, the discharge-pipe above referred to is or may be dispensed with, and an endless traveling belt or band, or an endless chain of buckets, may be used for effecting the removal from the machine of the substance taken from off the side of the basket or sieve by the said tool.

The action of the apparatus is as follows: The bracket D is moved toward the circumference of the basket B, and adjusted so as to cause the cutting-tool G to enter the substance to be removed. The said tool is then moved up and down, so that as the said substance is brought under the operation of the said tool by the revolution of the said basket a helical cut is made in the said substance. The portion thus cut away from the mass passes through the cutting-tool and the discharge-pipe in connection therewith, or (where a cutting-tool which is not tubular is used) onto the endless band or belt hereinbefore referred to. When the cutting-tool has arrived at the end of its upward or downward traverse and before its motion is reversed, the bracket D is again moved toward the side of the basket, so as to cause the said tool again to enter the substance to the depth required for the next cut.

Having now described the nature of my invention and the manner in which the same is to be performed, I wish it to be understood that I do not confine myself to the precise details and proportions hereinbefore described, as the same may be varied without departing from the nature of my said invention; but

I claim as my invention—

1. The addition, as hereinbefore described, of sulphate of alumina, sulphate of iron, sulphate of lime, and alumina, or of crude alum containing these substances, or any of them, to the substances hereinbefore cited as included in the specification of my Letters Patent of the United States, dated June 15, 1869.

2. The construction and use of a catch-pit with a mud channel and well, as and for the purpose hereinbefore described.

3. The improved mixing apparatus hereinbefore described, and illustrated in Figs. 1, 2, and 3 of the accompanying drawings—that is to say, a revolving shaft, having radial arms furnished with tangs or teeth, which work between stationary tangs or teeth, as and for the purpose described.

4. The improved construction and arrangement of precipitating apparatus hereinbefore described, and illustrated in Figs. 1, 2, 4, and 5 of the accompanying drawings—that is to say, tanks having sloping bottoms and mud-channels for collecting the sediment or mud precipitated from the sewage or sewage-water passing through the said tanks, and also a well or wells into which the said sediment or mud passes from the said channels, essentially as described.

5. The improvement hereinbefore described, and illustrated in Figs. 1, 2, and 6ᴬ of the accompanying drawings, in the construction of filters used for filtering sewage-water—that is to say, stretching over that which in filters of the ordinary construction is the top layer of filtering substance a sheet of canvas or other similar permeable material, and spreading a layer of sand over the said canvas or other material, as and for the purpose described.

6. The improved apparatus hereinbefore described, and illustrated in Figs. 7 to 12 (both inclusive) of the accompanying drawings, to be applied to hydro-extractors for the purpose of removing therefrom the substance dried therein—that is to say, a suitable cutting-tool carried by sliders working in brackets, the said slides being so arranged and worked as to give to the said tool the horizontal and vertical motions necessary to enable it to remove the mud or other substance accumulated around the side of the revolving basket, the said mud or other substance being discharged from the said basket either by means of an endless belt or of an endless chain of buckets or through a pipe attached to the cutting-tool.

G. W. WIGNER.

Witnesses:
  H. H. MURDOCH,
    7 *Staple Inn, London.*
  JAMES E. NAYLOR,
    71 *Cornhill, London, Notary's Clerk.*